S. VARNEY.
HAME FASTENER.
APPLICATION FILED APR. 9, 1908.
910,031.
Patented Jan. 19, 1909.
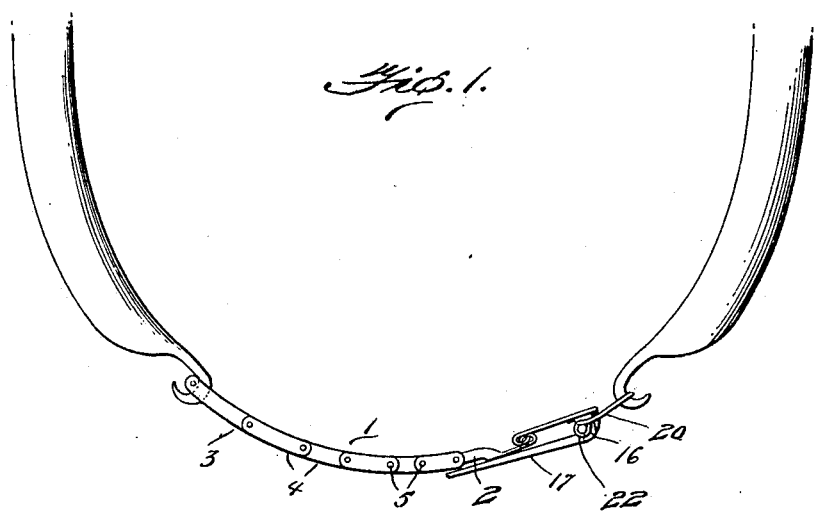
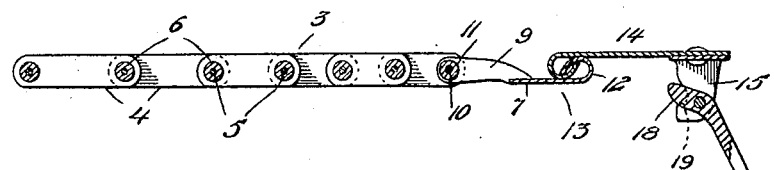
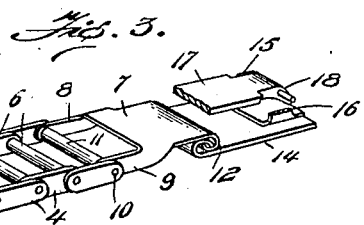
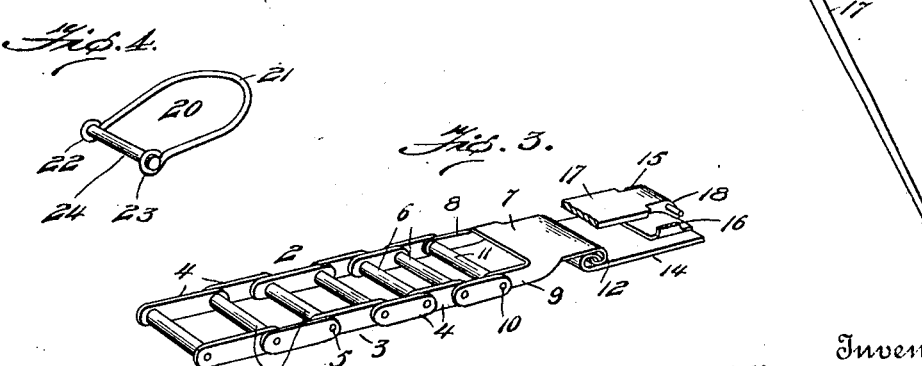
Witnesses
Inventor
S. Varney
Attorneys

UNITED STATES PATENT OFFICE.

SYLVESTER VARNEY, OF SCARVILLE, IOWA.

HAME-FASTENER.

No. 910,031.  Specification of Letters Patent.  Patented Jan. 19, 1909.

Application filed April 9, 1908. Serial No. 426,125.

*To all whom it may concern:*

Be it known that I, SYLVESTER VARNEY, a citizen of United States, residing at Scarville, in the county of Winnebago and State of Iowa, have invented certain new and useful Improvements in a Hame-Fastener; and I do declare the following to be a full, clear, and exact description of the invention, such as will enable others skilled in the art to which it appertains to make and use the same.

This invention relates to an improved hame fastener and the object thereof is to provide a simply constructed and efficient device of this character especially adapted for use in securing together the two ends of the hames of a driving or work harness and which may be used on collars and for other purposes to which it is adapted.

With the foregoing and other objects in view, the invention consists of certain novel features of construction, combination, and arrangement of parts, as will be more fully described and particularly pointed out in the appended claim.

In the accompanying drawings, Figure 1 is a side elevation of a portion of a hame with this device applied and in locked position; Fig. 2 is a longitudinal sectional view showing the fastener in unlocked position; Fig. 3 is a detail perspective view with parts broken away; Fig. 4 is a detail perspective view of the loop member.

In the embodiment illustrated, a flexible element 1 is shown preferably composed of two series, 2 and 3, of overlapping links as 4, the corresponding links of each series being connected by pins as 5. Rotatably mounted on these pins between the series of links 2 and 3 are a plurality of rollers as 6 composed of any suitable material.

A plate 7 is connected to one end of the flexible element 1 and is preferably provided with rearwardly extending spaced arms 8 and 9 connected by a pin 10 which also engages with one link of each series of the flexible element and has a roller 11 mounted on said pin 10 between the arms 8 and 9. This plate 7 is provided with an offset front portion 12. In the form shown the offset is produced by rolling the ends of two members 13 and 14 and connecting them as shown in interlocking engagement. Two laterally extending spaced apertured ears 15 and 16 project from the front end of the offset member 14 to form bearings for the lever now to be described.

A lever 17 having a cam member 18 formed at one end thereof is pivotally mounted between the ears 15 and 16, the cam being adapted to engage a complementary loop member and hold said lever in closed position. The ears 15 and 16 are provided at their inner edges with recesses 19 for a purpose to be described. A loop member 20 is preferably made from a piece of stiff wire and is composed of a U-shaped member 21 having eyes 22 and 23 at its opposite ends through which a connecting pin 24 passes.

The curved end of the member 21 is adapted to be engaged with one end of the hame and the lever 17 is adapted to pass through said loop and force the pin 24 thereof into locking engagement with the recesses as 19 of the ears 15 and 16 as shown in Fig. 1.

In the use of this device one of the rollers 6 is engaged with one end of the hame and the loop member 20 with the other end and the lever is passed through said loop and brought forward causing the pin 24 to drop into position into the recesses as 19 and when it is desired to unfasten the hames the opening of the lever 17 causes the cam 18 thereof to bear against the pin 24 and force it out of the recesses 19 and permit it to be freely disengaged from said lever.

Any one of the rollers of the flexible element 1 may be engaged with the hame to adapt the device for use on collars of varying sizes.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

In a hame fastener, the combination with a loop adapted to be engaged with one end of the hames, of a link adapted to be engaged with the other end of the hames, a connecting plate connected with the free end of said link, a flat lever carrying plate provided at one end with a pair of spaced ears formed in their inner side edges with recesses, a lever pivoted between said ears and provided with a cam to engage and hold the
5 loop in engagement with the recessed portions of said ears and to disengage the link from the same when the lever is moved downwardly, and interlocking flanges formed on the meeting ends of the connecting and
10 lever carrying plates, respectively, whereby the same are held in connected relation but may be disconnected.

In testimony whereof I have hereunto set my hand in presence of two subscribing witnesses.

SYLVESTER VARNEY.

Witnesses:
  GEO. J. THRAUTNEIT,
  O. T. IVERSON.